(12) United States Patent
Handschuck

(10) Patent No.: US 6,571,644 B2
(45) Date of Patent: Jun. 3, 2003

(54) METHOD AND DEVICE FOR DETERMINING THE FILLING LEVEL FOR THE ASCERTAINMENT OF THE SIMMERING PROCESS OF MINERAL OIL PRODUCTS

(75) Inventor: Bernhard Handschuck, Berlin (DE)

(73) Assignee: Petrotest Instruments GmbH & Co., Dahlewitz (DE)

(*) Notice: Subject to any disclaimer, the term of this patent is extended or adjusted under 35 U.S.C. 154(b) by 53 days.

(21) Appl. No.: 09/815,506

(22) Filed: Mar. 23, 2001

(65) Prior Publication Data

US 2001/0025527 A1 Oct. 4, 2001

(30) Foreign Application Priority Data

Mar. 23, 2000 (DE) .......................... 100 26 394

(51) Int. Cl.$^7$ .......................... G01F 13/00; G01F 23/00; A61M 5/14; G01N 21/85
(52) U.S. Cl. .................. 73/861.41; 73/290 R; 250/577; 604/253
(58) Field of Search .............................. 73/861.41, 149, 73/290 R; 604/253; 250/573, 577; 141/95; 222/25, 27; 377/21

(56) References Cited

U.S. PATENT DOCUMENTS

| | | | | |
|---|---|---|---|---|
| 2,880,764 A | * | 4/1959 | Pelavin | 141/130 |
| 3,563,090 A | * | 2/1971 | Deltour | 73/861.41 |
| 3,593,579 A | * | 7/1971 | Hindman | 73/194 |
| 4,432,761 A | * | 2/1984 | Dawe | 604/253 |
| 4,623,331 A | * | 11/1986 | Cewers et al. | 604/65 |
| 4,703,314 A | * | 10/1987 | Spani | 340/619 |
| 5,439,442 A | * | 8/1995 | Bellifemine | 604/65 |
| 5,938,643 A | * | 8/1999 | Lerner | 604/253 |

* cited by examiner

*Primary Examiner*—Hezron Williams
*Assistant Examiner*—Katina Wilson
(74) *Attorney, Agent, or Firm*—Goodwin Procter LLP; Brian L. Wamsley, Esq.

(57) ABSTRACT

The invention describes a method and a device for determining a filling level and can be applied to the ascertainment of the simmering process of mineral oil products. The method is characterized that by means of at least two stationary sensors, a first filling level and at least a second filling level are defined and the number of drops required for reaching the first and second filling levels is recorded. By way of a further sensor the number of drops dropped in during the simmering process is counted and, by way of calculation, the partial volume at a specified location and the filling level are determined. The device is characterized, wherein for the purpose of level recording in a measuring cylinder in a measuring arrangement a first stationary sensor and at least a second stationary sensor and a metering sensor are arranged, where the positions of the stationary sensors represent a defined relation to the filling level in the measuring cylinder and the metering sensor records the number of drops dropped in during the simmering process.

7 Claims, 2 Drawing Sheets

METHOD AND DEVICE FOR DETERMINING THE FILLING LEVEL FOR THE ASCERTAINMENT OF THE SIMMERING PROCESS OF MINERAL OIL PRODUCTS

The invention concerns a method and a device for determining the filling level and can be applied, in particular, for the ascertainment of the simmering process of mineral oil products.

When determining the simmering process of mineral oil products, a certain sample amount is heated in a distillation flask under pre-specified conditions and condensed again via a cooling tube. The condensed volume is retained in a measuring cylinder and the dependency of the volume increase to the temperature prevailing in the distillation flask in each case is ascertained.

The presentation of the temperature to the retained liquid volume provides conclusions with regard to the composition and usability of the distilled material and is internationally standardized. In particular, it is used in refineries for the purpose of inspecting fuels.

BACKGROUND OF THE INVENTION

This distillation test process was originally performed manually; at the present time, appropriate automatic devices are predominantly used in order to save time. Normally, in such cases, the surface of the liquid to be retained in the measuring cylinder is ascertained in its level by way of a following light barrier, and is thus indicated as a volume. This involves a solution where the light barrier, motor-driven, follows in a controlled manner the continually rising liquid level.

A disadvantage with the known solutions is the fact that the applied mechanical system is sophisticated, particularly because of the moving parts in the manufacture and maintenance, and is susceptible to disturbances during operation.

DESCRIPTION OF THE RELATED ART

For this reason, the invention is based on the task assignment of creating a method and a device which make possible the realization of an inexpensively manufacturable and reliably functioning measuring arrangement without the use of moving parts.

This task assignment is solved by the features in the claims 1, 3, 6 and 7. Purposeful embodiments of the invention are contained in the Subclaims.

A significant advantage of the invention lies in the fact that no moving parts are required for determining the filling level. This is realized in such a way that by means of at least two stationary sensors, a first filling level (level 1) and at least a second filling level (level 2) are defined and the number of drops required for reaching level 1 and level 2 is recorded, by way of a further sensor the number of drops dropped in during the simmering process is counted and, by way of calculation, the additional partial volume and the filling level is determined, or by means of the stationary sensors the first filling level (level 1) and at least the second filling level (level 2) are defined and the weight required for reaching level 1 and level 2 is recorded, the additional weight in the simmering process is measured and, again by means of calculation, the additional partial volume and the filling gauge level is determined.

A device which is inexpensive to manufacture, easy to operate and convenient to maintain is realized in such a way that, for the purpose of level recording in a measuring cylinder in a measuring arrangement a first stationary measuring sensor and at least a second stationary measuring sensor as well as a metering sensor is arranged, where the positions of the measuring sensors represent a defined relation to the filling gauge level in the measuring cylinder and the metering sensor records the number of drops dropped in during the simmering process. In like manner it is also possible to record the additional weight instead of drop counting where, for level recording in the measuring cylinder in the measuring arrangement, again a first stationary sensor and at least a second stationary sensor is arranged and the positions of the sensors represent a defined relation to the filling level in the measuring cylinder and the measuring cylinder is connected with means for recording the weight.

BRIEF DESCRIPTION OF THE DRAWINGS

The features of the invention will be better understood, at least in part, from the following descriptions of most preferred embodiments.

The illustrations show.

Figure 1:
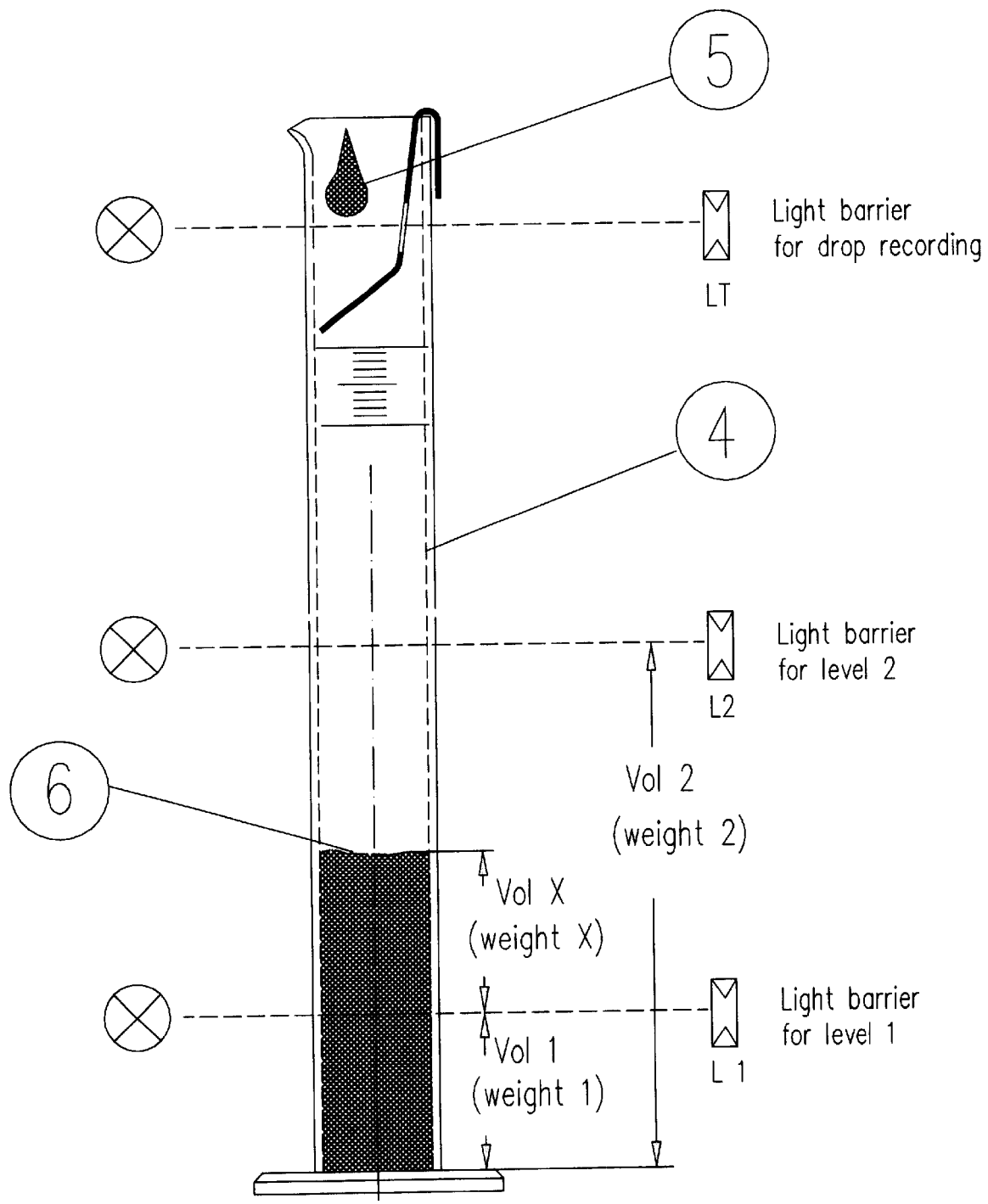
FIG. 1 A measuring arrangement for the recording of the filling level by means of light barriers FIG. 2 A principle illustration of the measuring arrangement in accordance with the state of the art As shown in FIG. 2, for the determination of the simmering process of mineral oil products, a certain sample amount is heated up in a distillation flask 1 under pre-specified conditions and again condensed by way of a cooling tube 3. The condensed amount is retained in a measuring cylinder 4 and the dependency of the volume increase to the temperature 2 prevailing in the distillation flask.
Figure 2:
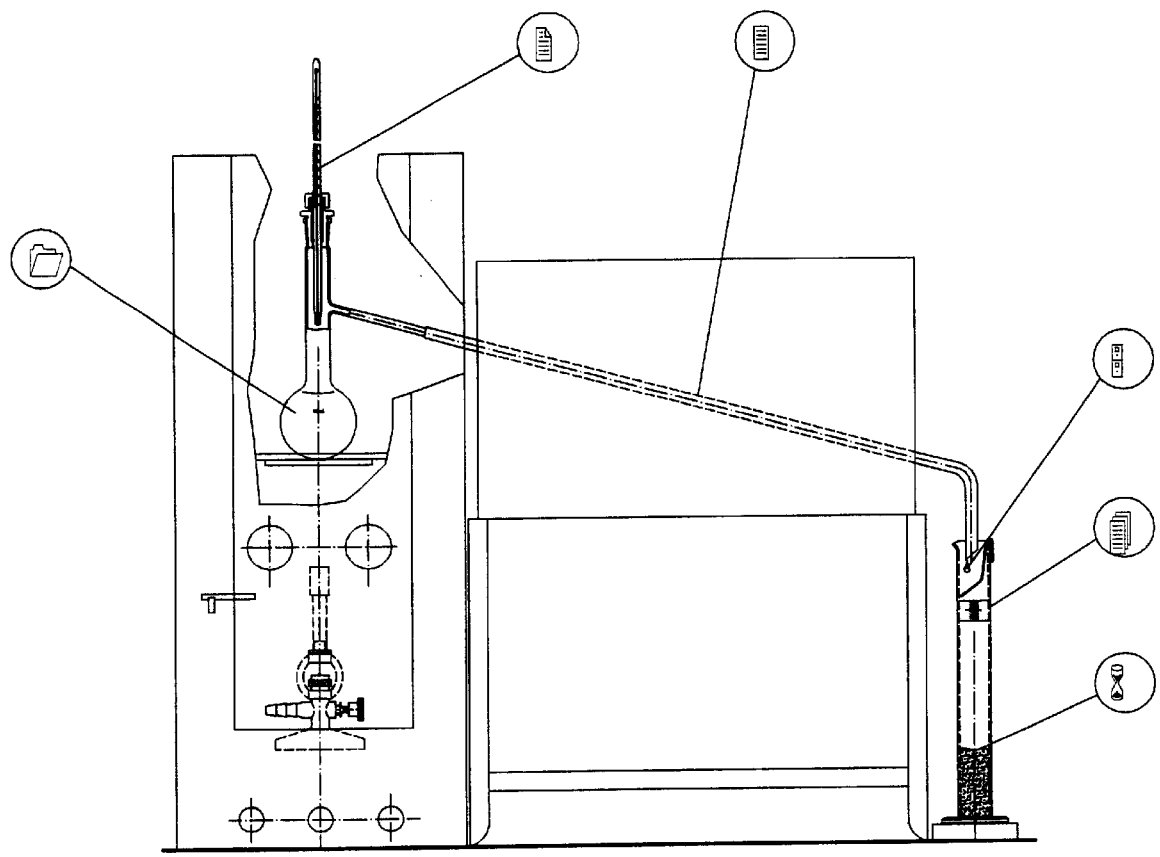

According to the embodiment of the invention as illustrated in FIG. 1, at least two light barriers L1, L2 are arranged which are calibrated once (volume filling level), so that their position represents a fixed and known relation to the respective filling degree of the measuring cylinder 4. Should liquid level 6, in each case, between both light barrier positions be ascertained, then this must be done by interpolation with the inclusion of a further reference variable. For this purpose, and according to this embodiment of the invention, the number of the passing drops 5 is adopted which is ascertained by way of a further light barrier LT. For the allocation to the dropped-in volume 6, the drops 5 are counted and the partial volume at the location x between two calibrated marks L1–L2 is proportionately ascertained.

The following relation applies:

$$\frac{Vol_2 - Vol_1}{Drop_2 - Drop_1} = \frac{Vol_x}{Drop_x}$$

From this, the following formula results:

$$Vol_x = \frac{(Vol_2 - Vol_1) * Drop_x}{Drop_2 - Drop_1}$$

For the calibrational rough recording of the filling levels, which corresponds to the positions of L1 and L2, sensors acting similar to the light barriers can be applied, such as switches, pressure switches, proximity elements (e.g., with the help of metal floating bodies) or self-heated temperature sensors.

In a second embodiment variant of the invention, instead of the use of a light barrier LT, a scale is placed under the measuring cylinder or weight sensors are suitably arranged. In this way, the measured masses when passing weight 1 and weight 2 can be converted onto the corresponding volume in the same manner as in the case of the light barrier embodiment example.

Then, this results in the following formula:

$$Vol_x = \frac{(Vol_2 - Vol_1) * Weight_x}{Weight_2 - Weight_1}$$

If the volume/weight is not constant over the entire amount, therefore more calibration points (L3, L4 . . . ) are envisaged for linearization (Weight$_3$, Weight$_4$).

As the measuring cylinder according to applicable standards is differently tempered, a fact to be noted when applying light barriers is that the glass surface of the measuring flask 4 does not go blind as a result of condensate formation and that the tempering of the same takes place as quickly as possible. Normally, this is done in a tempering chamber.

According to a purposeful embodiment form of the invention, a tempering chamber in the form of a block and extensively adapted to the measuring cylinder 4 is arranged. As a result of the very small air space around the measuring cylinder, condensate formation is avoided and it is possible to change temperatures quickly. The block, and with it the measuring cylinder 4, is directly or indirectly tempered e.g., by way of liquid.

The invention is not restricted to the embodiment variants as described here. Moreover, it is possible to create further forms of realization by means of variation of the process steps and features already mentioned here, without going beyond the framework of the invention itself.

What is claimed is:

1. Method for determining the filling level for the ascertainment of the simmering process of mineral oil products, wherein by means of at least two stationary sensors a first filling level (Level 1) and at least a second filling level (Level 2) are defined and the weight required for reaching Level 1 and Level 2 is recorded, the additional weight in the simmering process is measured and, by means of calculation, the partial volume at the location x and the filling level is determined.

2. Method according to claim 1, wherein the partial volume x is calculated by the following formula:

$$Vol_x = \frac{(Vol_2 - Vol_1) * Weight_x}{Weight_2 - Weight_1}.$$

3. Method according to claim 2, wherein the filling level determination is effected in a tempered manner.

4. Device for determining the filling level for the ascertainment of the simmering process of mineral oil products, wherein for level recording in a measuring cylinder (4) in a measuring arrangement a first stationary sensor (L1) and at least a second stationary sensor (L2) is arranged, where the positions of the sensors (L1, L2) represent a defined relation to the filling level in the measuring cylinder (4) and the measuring cylinder (4) is connected with means for recording the weight.

5. Device according to claim 4, wherein the sensors (L1, L2) are light barriers and/or switches and/or proximity elements.

6. Device according to claim 4, wherein at the measuring cylinder (4) a tempering chamber in the form of a block is arranged which is extensively adapted to the contour of the measuring cylinder (4).

7. Device according to claim 5 wherein at the measuring cylinder (4) a tempering chamber in the form of a block is arranged which is extensively adapted to the contour of the measuring cylinder (4).

* * * * *